United States Patent
Kang et al.

(10) Patent No.: US 9,931,863 B2
(45) Date of Patent: Apr. 3, 2018

(54) MOBILE IMAGE FORMING APPARATUS, IMAGE COMPENSATION METHOD THEREOF AND NON-TRANSITORY COMPUTER READABLE RECORDING MEDIUM

(71) Applicant: Samsung Electronics Co., Ltd., Suwon-si, Gyeonggi-do (KR)

(72) Inventors: Hyun-woo Kang, Suwon-si (KR); Kyu-suk Lee, Suwon-si (KR); Tae-sik Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/069,196

(22) Filed: Mar. 14, 2016

(65) Prior Publication Data

US 2017/0018093 A1    Jan. 19, 2017

(30) Foreign Application Priority Data

Jul. 16, 2015    (KR) .......................... 10-2015-0101018

(51) Int. Cl.
| | |
|---|---|
| *B41J 3/407* | (2006.01) |
| *G06K 9/46* | (2006.01) |
| *H04N 1/60* | (2006.01) |
| *B41J 3/36* | (2006.01) |
| *G06K 9/00* | (2006.01) |
| *H04N 1/54* | (2006.01) |

(52) U.S. Cl.
CPC ............... *B41J 3/4073* (2013.01); *B41J 3/36* (2013.01); *G06K 9/00* (2013.01); *G06K 9/4652* (2013.01); *H04N 1/54* (2013.01); *H04N 1/6008* (2013.01)

(58) Field of Classification Search
CPC ......... B41J 3/4073; B41J 3/36; G06K 9/4652; H04N 1/6008
See application file for complete search history.

(56) References Cited

U.S. PATENT DOCUMENTS

| | | | |
|---|---|---|---|
| 6,341,831 B1 | 1/2002 | Weber et al. | |
| 6,382,762 B1* | 5/2002 | Therien | ................ B41J 2/14153 324/76.14 |
| 7,295,224 B2* | 11/2007 | Busch | .................... B41J 2/3555 347/188 |

(Continued)

FOREIGN PATENT DOCUMENTS

| | | |
|---|---|---|
| EP | 1 091 564 A2 | 4/2001 |
| JP | 10181002 A * | 7/1998 |

(Continued)

*Primary Examiner* — Justin Seo
(74) *Attorney, Agent, or Firm* — Jefferson IP Law, LLP

(57) ABSTRACT

A mobile image forming apparatus and an image compensation method of the mobile image forming apparatus are provided. The mobile image forming apparatus includes a surface measurer configured to measure an area touched by the mobile image forming apparatus among a surface area on which a print image is to be printed, an image processor configured to retrieve at least one of curvature data and moisture data from the measured result, and compensate the print image based on the at least one of the curvature data and moisture data retrieved, and an image former configured to print the compensated print image on the surface.

6 Claims, 13 Drawing Sheets

(56) References Cited

U.S. PATENT DOCUMENTS

| | | | | |
|---|---|---|---|---|
| 8,079,765 B1* | 12/2011 | Bledsoe | ................... | B41J 2/145 |
| | | | | 347/109 |
| 8,083,422 B1* | 12/2011 | Simmons | ................... | B41J 3/36 |
| | | | | 347/109 |
| 8,128,192 B1* | 3/2012 | Simmons | ............. | B41J 2/14016 |
| | | | | 347/109 |
| 8,345,306 B1* | 1/2013 | Bledsoe | ................. | G06K 9/228 |
| | | | | 358/1.18 |
| 2002/0070988 A1* | 6/2002 | Desormeaux | ........ | B41J 2/16505 |
| | | | | 347/8 |
| 2002/0196457 A1* | 12/2002 | Nunokawa | ........... | H04N 1/6091 |
| | | | | 358/1.13 |
| 2006/0018698 A1* | 1/2006 | Vogt | ....................... | B41J 11/002 |
| | | | | 400/149 |
| 2006/0088355 A1* | 4/2006 | Ribi | ........................... | B41J 3/28 |
| | | | | 400/88 |
| 2006/0204309 A1* | 9/2006 | Gilmour | ................ | B41J 11/663 |
| | | | | 400/621 |
| 2008/0204503 A1* | 8/2008 | Studer | .................. | B41J 2/16547 |
| | | | | 347/23 |
| 2008/0216947 A1 | 9/2008 | Gilchrist | | |
| 2009/0025747 A1* | 1/2009 | Edgar | ................... | A45D 44/005 |
| | | | | 132/320 |
| 2009/0309946 A1* | 12/2009 | Saquib | ................... | B41J 2/3555 |
| | | | | 347/191 |
| 2011/0162673 A1* | 7/2011 | Samain | ................ | A45D 44/005 |
| | | | | 132/317 |
| 2013/0314460 A1 | 11/2013 | Orr | | |
| 2014/0111594 A1* | 4/2014 | Schuh | ...................... | B41J 11/42 |
| | | | | 347/218 |
| 2015/0059026 A1 | 2/2015 | Hermans et al. | | |
| 2017/0334195 A1* | 11/2017 | Brassil | ................ | B41J 2/04508 |

FOREIGN PATENT DOCUMENTS

| | | |
|---|---|---|
| JP | 2003-519019 A | 6/2003 |
| KR | 10-2015-0001944 A | 1/2015 |
| WO | 01/49360 A1 | 7/2001 |

* cited by examiner

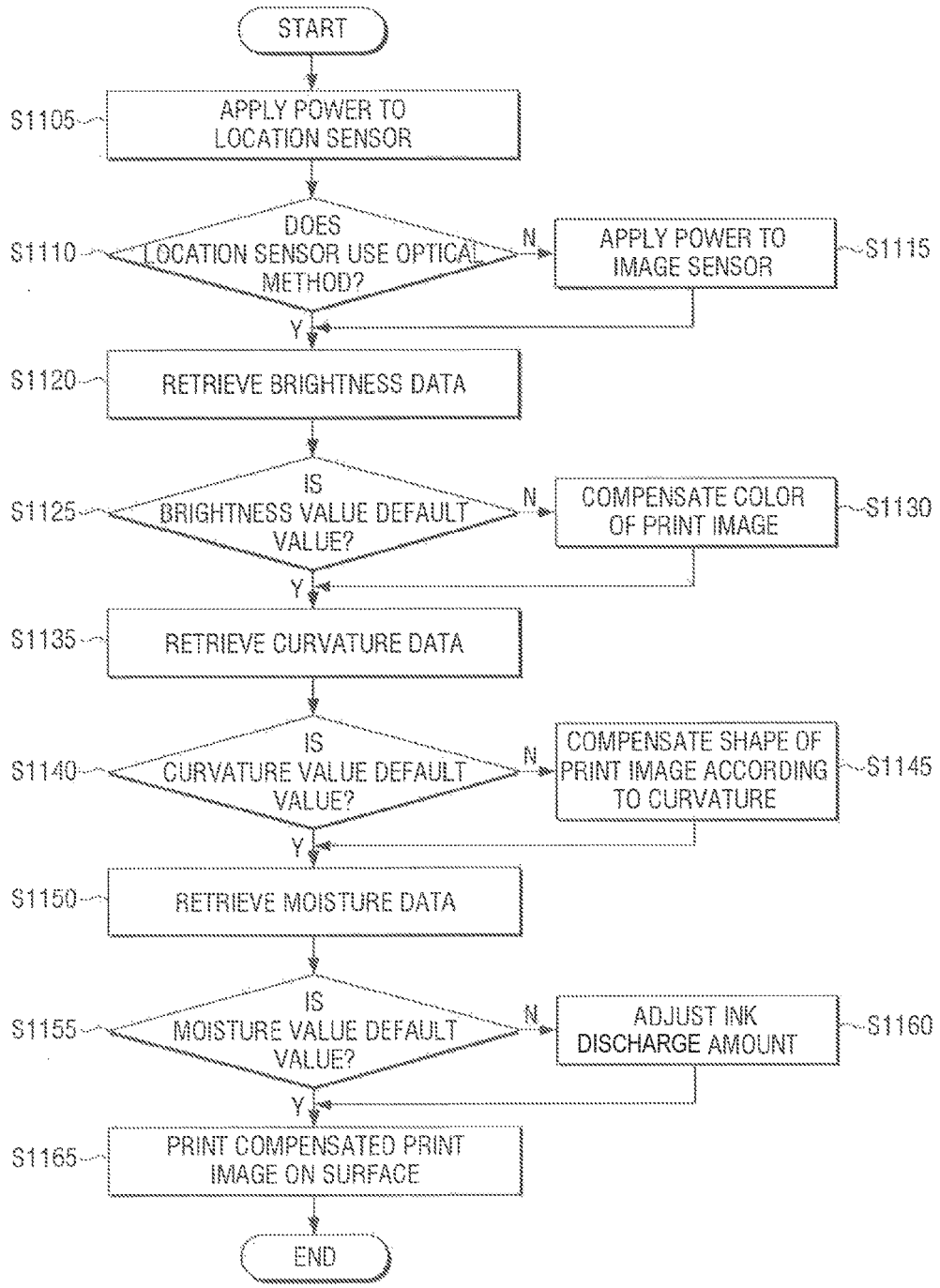

MOBILE IMAGE FORMING APPARATUS, IMAGE COMPENSATION METHOD THEREOF AND NON-TRANSITORY COMPUTER READABLE RECORDING MEDIUM

CROSS-REFERENCE TO RELATED APPLICATIONS

This application claims the benefit under 35 U.S.C. § 119(a) of a Korean patent application filed on Jul. 16, 2015 in the Korean Intellectual Property Office and assigned Serial number 10-2015-0101018, the entire disclosure of which is hereby incorporated by reference.

TECHNICAL FIELD

The present disclosure relates to a mobile image forming apparatus, an image compensation method thereof, and non-transitory computer readable recording medium. More particularly, the present disclosure relates to a mobile image forming apparatus capable of compensating an image being printed on skin based on the surface state and curved state of the skin such that the image being printed on the skin may be similar to the original image, and an image compensation method thereof, and a non-transitory computer readable recording medium thereof.

BACKGROUND

As people become increasingly interested in tattoos and body painting and the like, there is increasing demand for printers capable of printing on skin. Tattoos or body painting must be performed by experts, and thus lack accessibility which is an issue. Using a mobile printer provides an advantage that a user may easily print a desired image on skin and that a variety of images may be used.

However, in the case of printing an image on skin using a mobile printer, there may be much difference between the original image to be printed and a result image printed on the skin, which is an issue. More specifically, depending on the skin color and state of the skin used as the background of the image, there may be a difference between the original image and the result image in terms of color tone. Furthermore, there is another issue that the shape of the printed image may be distorted due to curves in the human body, unlike when printing an image on a plane surface.

Therefore, a need exists for a mobile image forming apparatus capable of compensating an image being printed on skin based on the surface state and curved state of the skin such that the image being printed on the skin may be similar to the original image, and an image compensation method thereof, and a non-transitory computer readable recording medium thereof.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mobile image forming apparatus capable of compensating an image being printed on skin based on the surface state and curved state of the skin such that the image being printed on the skin may appear similar to the original image, and an image compensation method thereof, and a non-transitory computer readable recording medium thereof.

In accordance with an aspect of the present disclosure, a mobile image forming apparatus is provided. The mobile image forming apparatus includes a surface measurer configured to measure an area touched by the mobile image forming apparatus among a surface area on which a print image is to be printed, an image processor configured to retrieve at least one of curvature data and moisture data from the measured result, and to compensate the print image based on the at least one of the curvature data and moisture data retrieved, and an image former configured to print the compensated print image on the surface.

The surface measurer may include at least one location sensor configured to determine the area touched by the mobile image forming apparatus, and an image sensor configured to photograph an image of an area touched by the location sensor, wherein the image processor analyzes the photographed image to retrieve at least one of brightness data and curvature data, and compensates the print image based on the at least one of the brightness data and curvature data retrieved.

The surface measurer may further include a moisture sensor configured to measure a moisture content or potential hydrogen ion concentration (pH) of the touched area, wherein the image processor compensates an ink discharge amount for the print image based on the measured moisture content or hydrogen ion concentration.

Each of the at least one location sensor may be arranged on a horizontal and vertical line of where the image former is arranged, and a two-dimensional motion of the mobile image forming apparatus may be detected using each of the arranged location sensor.

The image processor may compensate a color of the print image using a pre-stored conversion table based on the retrieved brightness data.

The image processor, in response to the brightness of the retrieved brightness data being low, may compensate a discharge amount of white (W) ink, among cyan (C), magenta M, yellow (Y), and W ink, to increase.

The image processor may analyze the photographed image to detect a curved state of the touched area, and perform a three-dimensional rendering on the two-dimensional print image according to the detected curved state.

The image former may include a head configured to discharge ink, and a coating unit configured to spray a coating agent before and after the ink is discharged from the head.

The mobile image forming apparatus may further include a display, and a user interface configured to receive a user input, wherein the image processor controls the display to compose the print image on the surface area on which the print image is to be printed, and to display the composed image, and in response to receiving a user input for adjusting a location or size of the displayed image, compensating the print image to respond to the received user input.

The mobile image forming apparatus may further include a camera configured to photograph an image, wherein the photographed image is used as the print image.

The mobile image forming apparatus may further include a communication interface, wherein the image processor controls the communication interface to remove a skin color from the photographed image, and to search online for an image that is similar to the image from which the skin color has been removed, and the searched image may be used as the print image.

In accordance with another aspect of the present disclosure, an image compensation method of a mobile image forming apparatus is provided. The method includes measuring an area touched by the mobile image forming apparatus among a surface area on which a print image is to be printed, retrieving at least one of curvature data and moisture data from the measured result, compensating the print image based on the at least one of the curvature data and moisture data retrieved, and printing the compensated print image on the surface.

The retrieving may include photographing an image of the touched area, and analyzing the photographed image to retrieve at least one of brightness data and curvature data, wherein the compensating involves compensating the print image based on the at least one of the brightness data and curvature data retrieved.

The measuring may further include measuring a moisture content or potential hydrogen ion concentration (pH) of the touched area, wherein the compensating involves compensating an ink discharge amount for the print image based on the measured moisture content or hydrogen ion concentration.

The compensating may involve compensating a color of the print image using a pre-stored conversion table based on the retrieved brightness data.

The compensating may involve, in response to the brightness of the retrieved brightness data being low, compensating a discharge amount of W ink, among C, M, Y, and W ink, to increase.

The compensating may involve analyzing the photographed image to detect a curved state of the touched area, and performing a three-dimensional rendering on the two-dimensional print image according to the detected curved state.

The compensating may further include composing the print image on a surface area on which the print image is to be printed, and displaying the composed image, and in response to receiving a user input for adjusting a location or size of the displayed image, compensating the print image to respond to the received user input.

The method may further include photographing an image, removing a skin color from the photographed image, and searching online for an image that is similar to the image from which a skin color has been removed, wherein the searched image is used as the print image.

In accordance with another aspect of the present disclosure, a non-transitory computer readable recording medium is provided. The non-transitory computer readable recording medium includes a program for executing an image compensation method of a mobile image forming apparatus, the method of the mobile image forming apparatus including measuring an area touched by the mobile image forming apparatus among a surface area on which a print image is to be printed, retrieving at least one of curvature data and moisture data from the measured result, compensating the print image based on the at least one of the curvature data and moisture data retrieved, and printing the compensated print image on the surface.

As aforementioned, according to the various embodiments of the present disclosure, it is possible to compensate a print image being printed on skin to be similar to an original image as much as possible by taking into account the skin color, body curvature and skin conditions that differ from people to people.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and/or other aspects, features, and advantages of certain embodiments of the present disclosure will be more apparent from the following description taken in conjunction with the accompanying drawings, in which:

FIGS. 10 and 11 are flowcharts illustrating an image compensation method of an image forming apparatus according to various embodiments of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly those of ordinary skill in the art will recognize that various changes and modifications of the various embodiments described herein can be made without departing from the scope and spirit of the present disclosure. In addition, descriptions of well-known functions or constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "first", "second", and the like, may be used to describe diverse components, but the components are not limited by the terms. The terms are only used to distinguish one component from the others.

In the present application, the terms "include" and "consist of" designate the presence of features, numbers, operations, components, elements, or a combination thereof that are written in the specification, but do not exclude the presence or possibility of addition of one or more other features, numbers, operations, components, elements, or a combination thereof.

In embodiments of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Figure 1:
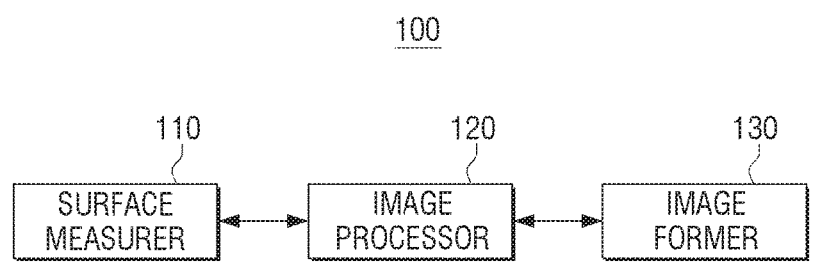
FIG. 1 is a block diagram schematically illustrating a configuration of a mobile image forming apparatus according to an embodiment of the present disclosure.

FIG. 1 is a block diagram schematically illustrating a configuration of a mobile image forming apparatus according to an embodiment of the present disclosure.

Referring to FIG. 1, a mobile image forming apparatus 100 includes a surface measurer 110, an image processor 120, and an image former 130.

Herein, the mobile image forming apparatus 100 may be configured such that the mobile image forming apparatus 100 may be held and moved by a user as the mobile image forming apparatus 100 performs a printing function on a surface where the user intends to print an image. Unlike a general image forming apparatus that is configured to print a two-dimensional image as a print medium (for example, paper) and an ink cartridge each makes a one-dimensional motion, the mobile image forming apparatus 100 according to an embodiment of the present disclosure is configured such that a head 131 of the mobile image forming apparatus 100 makes a two-dimensional motion on a print medium (for example, skin of a human body) that does not move so as to print a two-dimensional image. Furthermore, the mobile image forming apparatus 100 may use an ink configuration of cyan (C), magenta (M), yellow (Y), and white (W) instead of C, M, Y, and black (K), due to the fact that the mobile image forming apparatus 100 prints on skin. However, there is no limitation that the mobile image forming apparatus 100 has to use an ink configuration of C, M, Y, and W only.

The mobile image forming apparatus 100 is portable, and is characterized that the print medium is not limited to a certain size. Therefore, an image may be easily printed on a variety of places, such as skin of a person, fabric, and the like. Hereinafter, explanation will be made with a main focus on an example of printing an image on a person's skin, but without limitation, and thus the print medium may not necessarily be human skin.

The surface measurer 110 may measure the state of a surface area on which a print image is to be printed. For example, the surface measurer 110 may measure an area touched by the mobile image forming apparatus 100 among a surface area. Examples of the surface measurer 110 include a variety of measuring apparatuses, such as a location sensor, an image sensor, a moisture sensor, an optical sensor, and the like.

The surface measurer 110 may determine an area touched by the mobile image forming apparatus 100, photograph an image of the touched area, and measure a moisture content or potential hydrogen ion concentration (pH) of the touched area.

The image processor 120 may compensate a print image according to conditions of a surface on which the print image is to be printed. For example, the image processor 120 may retrieve at least one of brightness data, curvature data, and moisture data based on a result measured in the surface measurer 110. In addition, the image processor 120 may compensate a print image based on the retrieved data.

For example, the image processor 120 may compensate a color and tone of the print image based on the brightness data. The image processor 120 may compensate the color of the print image using a pre-stored conversion table. In the case where the skin of the area on which an image is to be printed is dark, the image processor 120 may adjust to increase the discharge amount of W ink.

In another example, the image processor 120 may perform a three-dimensional rendering on a two-dimensional print image according to the curved state of where the print image is to be printed based on the curvature data. In the case of printing an image on an arm, the image processor 120 may distort the shape of a plane print image to express a sensation of the plane print image being wound as the image processor 120 is being output.

In another example, the image processor 120 may compensate an ink discharge amount for the print image based on moisture data. The moisture data may include the amount of moisture, concentration of hydrogen ions (pH), and the like. The image processor 120 may compensate the print image in such a manner as by increasing the ink discharge amount, in response to the skin being dry, and by decreasing the ink discharge amount, in response to the skin being oily.

The image former 130 may print a print image on a surface. A general image forming apparatus would print an image by discharging ink by one-dimensional line but the image former 130 of the mobile image apparatus 100 according to an embodiment of the present disclosure prints an image while moving in two-dimensions.

The image former 130 may include not only a head 131 for discharging ink, but also a coating unit 133 configured to spray a coating agent before and after the discharge of ink in order to improve the print quality. The reason for spraying a coating agent is because an image printed on skin or fabric, and the like, may have a deteriorated quality in terms of ink adhesion, color reproducibility, quick dryness, and wear resistance when compared to printing an image on paper.

By using the aforementioned mobile image forming apparatus 100, it is possible to provide an effect of compensating a print image such that it may be similar to the original image based on the skin color, extent of body curvature, and skin conditions, and the like, that may differ from person to person.

Figure 2:
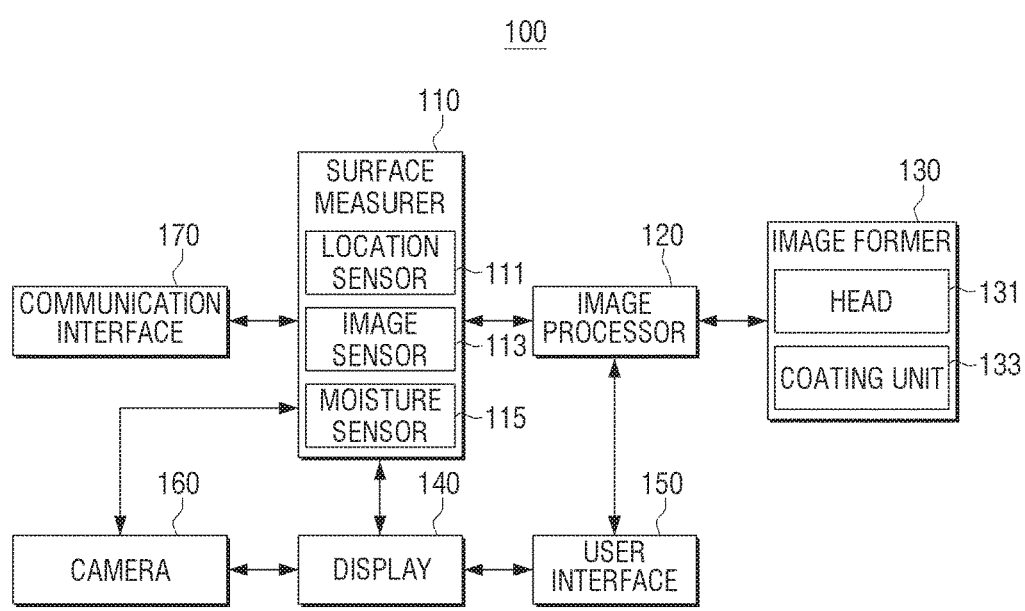
FIG. 2 is a block diagram illustrating a configuration of a mobile image forming apparatus according to an embodiment of the present disclosure.

FIG. 2 is a block diagram illustrating a configuration of a mobile image forming apparatus according to an embodiment of the present disclosure.

Referring to FIG. 2, the mobile image forming apparatus 100 may include a surface measurer 110, an image processor 120, an image former 130, a display 140, a user interface 150, a camera 160, and a communication interface 170.

The surface measurer 110 may measure, among a surface area on which a print image is to be printed, an area touched by the mobile image forming apparatus 100.

Figure 3:
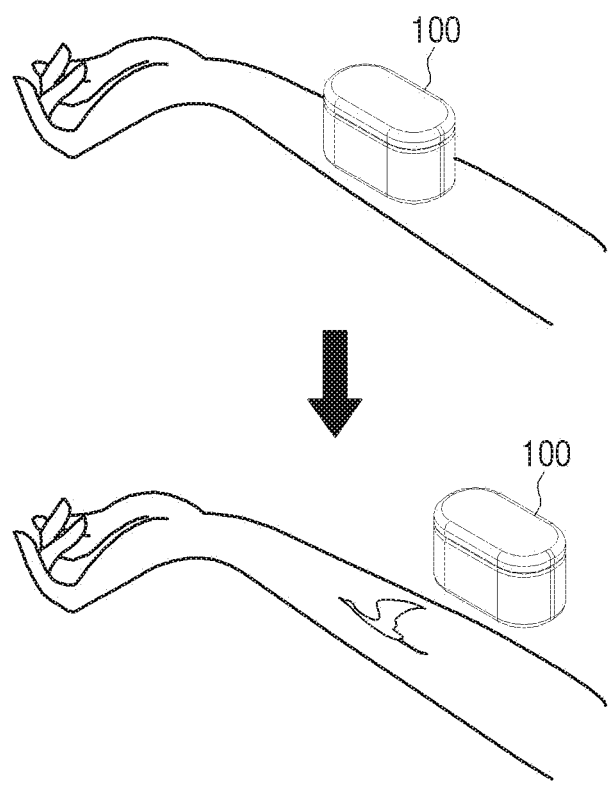
FIG. 3 illustrates a concept of an operation of a mobile image forming apparatus according to an embodiment of the present disclosure.

FIG. 3 illustrates a concept of an operation of a mobile image forming apparatus according to an embodiment of the present disclosure.

Referring to FIG. 3, the mobile image forming apparatus 100 may touch a body part of a user and print a desired image on the skin. Therefore, there exists a need to compensate the print image by analyzing the area touched by the mobile image forming apparatus 100. The surface measurer 110 may be realized in a variety of forms of a measuring apparatus. For example, the surface measurer 110 may include a location sensor 111, an image sensor 113, and a moisture sensor 115.

The location sensor 111 may perform a function of identifying a location of the mobile image forming apparatus 100. The location sensor 111 may determine the area touched by the mobile image forming apparatus 100. Furthermore, the location sensor 111 may detect a location to which the mobile image forming apparatus 100 moved on the surface.

Since the mobile image forming apparatus 100 makes a two-dimensional motion, there needs to be at least one location sensor in each of a vertical and horizontal direction to the image former 130. For example, motion of the mobile image forming apparatus 100 may be detected using a first location sensor 111 configured to detect an up/down motion and a second location sensor 111' configured to detect a left/right motion. Explanation on an arrangement of the location sensor 111 will be made later on with reference to FIG. 5.

The image sensor 113 may perform a function of photographing an image of an area, touched by the mobile image forming apparatus. Based on the image photographed in the image sensor 113, the image processor 120 may analyze the brightness or curved state of the surface. For example, the image sensor 113 may be realized as a charge coupled device (CCD) element or complementary metal oxide semiconductor (CMOS) element. A CCD is an element where each metal-oxide-silicon (MOS) capacitor is arranged very closely and where an electron carrier is stored in a capacitor and is transferred. A CMOS image sensor is an element configured to adopt a switching method of detecting an output one by one using MOS transistors created as many as the number of pixels using the CMOS technology of using a control circuit and a signal processing circuit as peripheral circuits.

In the case of a location sensor 111 realized as a sensor using an optical method so as to detect the brightness or curved state of a print surface, the location sensor 111 may be realized to substitute for the function of the image sensor 113.

The moisture sensor 115 may measure the moisture content of a print surface. For example, the moisture sensor 115 may measure the moisture content of a corneum layer of the skin. Furthermore, the moisture sensor 115 may measure the potential hydrogen ion concentration (pH) of the skin. The image processor 120 may adjust the ink discharge amount for a print image using the moisture data measured in the moisture sensor 115. The criteria for determining skin conditions will be described below.

The moisture sensor 115 may measure the moisture content or hydrogen ion concentration based on changes in capacitance or resistance value. For example, the moisture sensor 115 may be realized to include two metal measurers. For the sake of easy measurement, the moisture sensor 115 may be realized to include a measurer that protrudes therefrom. Herein, the moisture sensor 115 may be configured such that the moisture sensor 115 protrudes only when measuring moisture data. For example, in an embodiment of the present disclosure, the mobile forming apparatus 100 may be configured such that the mobile forming apparatus 100 measures only brightness data or curvature data and the moisture sensor 115 operates only when detailed skin information is needed.

The image processor 120 may retrieve at least one of brightness data, curvature data and moisture data using a result of measurement from the surface measurer 110. Furthermore, the image processor 120 may compensate a print image based on the retrieved data.

The image processor 120 may analyze a skin image photographed at the surface measurer 110 and retrieve brightness data. For example, the image processor 120 may compensate the color, tone or brightness of a print image based on the retrieved brightness data. In the case where the skin on which an image is to be printed is dark (low brightness), it is necessary to increase the ink discharge amount in order to make the print distinct. Therefore, the image processor 120 may compensate the ink discharge amount to increase as the brightness of the retrieved brightness data decreases. The image processor 120 may be realized to increase only the ink discharge amount of W ink among C, M, Y, and W ink in order to increase the brightness.

The image processor 120 may use a pre-stored conversion table in order to adjust the color, tone, and brightness of a print image. The image processor 120 may retrieve data for differentiating the brightness, and differentiate color tones of the skin by comparing with a reference value stored in the conversion table. Furthermore, the image processor may compensate a color tone of a print image using the pre-stored conversion table. If the retrieved brightness data is the same as a default value, the image processor 120 may omit compensating the brightness.

The image processor 120 may analyze a photographed image and retrieve curvature data. Furthermore, the image processor 120 may compensate the shape of a print image using the retrieved curvature data. The image processor 120 may analyze the photographed image to detect the curved state of the area on which the print image is to be printed, and perform a three-dimensional rendering on the two-dimensional formation of the print image according to the detected curved state of the area. For example, the image processor 120 may analyze a distance perspective of the print position on the photographed image and identify the extent of the curvature.

In another example, the image processor 120 may analyze the photographed image to determine which part of the body the photographed image is, and predict a curvature of the print position and compensate the print image. In the case of FIG. 3, since the part of the body on which to print an image is an arm, the image processor 120 may predict the curvature of the arm and compensate the print image. If user information had been pre-input, the image processor 120 may combine information, such as the gender, height, weight, and the like, with information on the body part and predict the extent of curvature. If a plane print image is printed as it is without taking into consideration of the curvature, an image different from what was intended by the user will be printed. Therefore, even when a plane image is printed on a curved skin, the image processor 120 compensates the print image using the curvature data in order to minimize deformation of the original image. In the case of printing an image on an arm as illustrated in FIG. 3, the image processor 120 may distort the shape of the print image to express a sensation of the plane print image being wound as the print image is being output.

The image processor 120 may compensate the ink discharge amount for the print image based on the measured moisture content or hydrogen ion concentration. For example, the image processor 120 may determine the skin state according to measured values as shown in Table 1 below, and compensate the ink discharge amount according to the determined skin state.

TABLE 1

| Measured value | Skin state | Ink discharge amount |
| --- | --- | --- |
| Moisture content: less than 15% pH: more than 6.5 | Dry | Twice the default value |
| Moisture content: 15~30% pH 5~6.5 | Neutral | Default value |
| Moisture content: more than 30% pH: less than 5 | Oily | Half the default value |

The determination criteria disclosed in Table 1 is a mere example, and thus the skin state may be determined according to other conditions instead.

Human skin needs enzymes, such as phospholipase and β-gluco-cerebrosidase. The hydrogen ion concentration of skin differs according to the ratio of these enzymes. The lower the hydrogen ion concentration the more oily the skin is.

Figure 4:
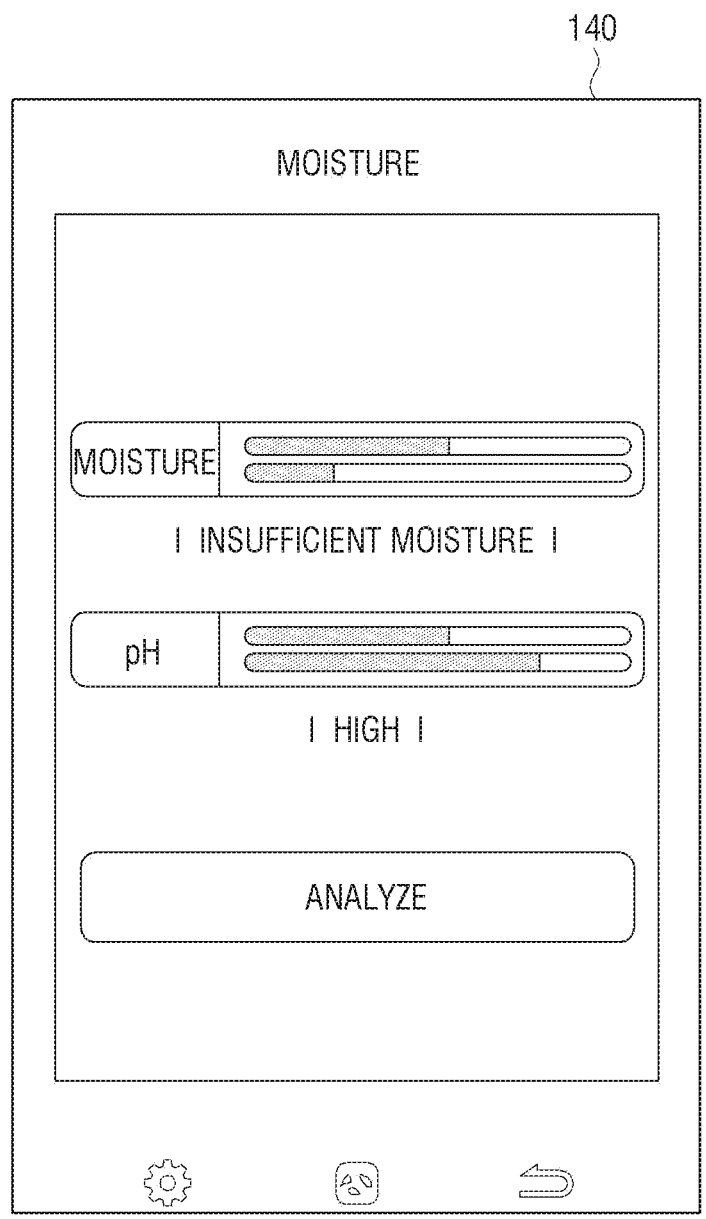
FIG. 4 illustrates displaying a result of analyzing moisture data on a display according to an embodiment of the present disclosure.

FIG. 4 illustrates displaying a result of analyzing moisture data on a display according to an embodiment of the present disclosure.

Referring to FIG. 4, moisture content and hydrogen ion concentration may be displayed while changing in real time in response to the measurement result. Furthermore, in response to a user command for pressing an analyzing button, the image processor 120 may determine the skin state according to a certain condition. For example, since in FIG. 4, the moisture content of the skin is low and the hydrogen ion concentration is high, the image processor 120 will determine that the state of skin is dry.

In response to the determined state of skin being dry, the image processor 120 may adjust the ink discharge amount to increase. On the other hand, in response to the determined state of skin being oily, the image processor 120 may adjust the ink discharge amount to decrease.

The image former 130 may print a print image on the surface of skin. The image former 130 may include a head 131 for discharging ink and a coating unit 133 for spraying a coating agent.

The head 131 discharges ink according to the type of discharge amount determined based on the print data. For example, ink to be used on the skin may consist of four types: C, M, Y, and W.

Figure 5:
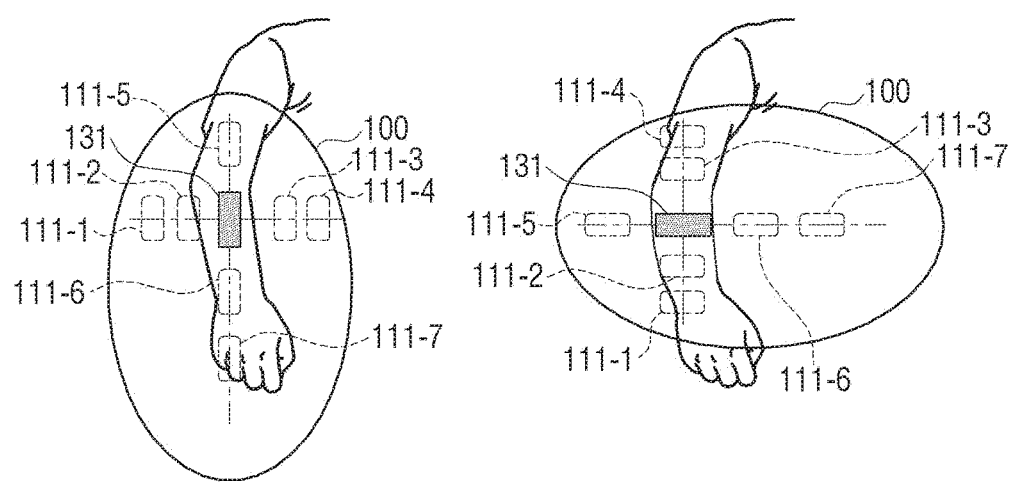
FIG. 5 illustrates an arrangement of a location sensor according to an embodiment of the present disclosure.

FIG. 5 illustrates an arrangement of a head and a plurality of location sensors according to an embodiment of the present disclosure.

Referring to FIG. 5, a plurality of location sensors 111-1, 111-2, 111-3, 111-4, 111-5, 111-6, and 111-7 may be displayed on the image former 130, more specifically on a horizontal and vertical line of where the head 131 is arranged. Through the location sensors 111 arranged in horizontal and vertical directions, two-dimensional motions of the mobile image forming apparatus 100 may be detected.

In order to print a print image on a surface with the mobile image forming apparatus 100, the mobile image forming apparatus 100 must be moved such that the head 131 moves over a certain area on which the print image is to be printed. Therefore, in response to not being able to identify the exact location of the mobile image forming apparatus 100, it is impossible to know which ink should be discharged on where the head 131 is currently located. Furthermore, the mobile image forming apparatus 100 needs to perform a two-dimensional motion to print a two-dimensional image, and therefore, in order to identify the exact location of the mobile image forming apparatus 100, at least one location sensor 111 is necessary for a vertical and horizontal motion, respectively. For example, there needs to be at least two location sensors 111 in order to identify the location of the mobile image forming apparatus 100, and as illustrated in FIG. 5, when numerous location sensors 111-1, 111-2, 111-3, 111-4, 111-5, 111-6, and 111-7 are arranged, locations may be identified more exactly.

The method of identifying the location of the mobile image forming apparatus 100 is as follows. First of all, the skin surface initially touched by the mobile image forming apparatus 100 is set to coordinates (0,0). Then, the up/down motion and left/right motion of the mobile image forming apparatus 100 may be detected through each of the location sensors 111. As such, it is possible to know the initial coordinates and the amount of motion, and therefore, it is possible to identify the exact location of the mobile image forming apparatus 100.

In another example, it is possible to emit light of a grid pattern on the skin surface on which a print image is to be printed by laser, and the like, so as to identify absolute location coordinates of the mobile image forming apparatus 100.

The coating unit 133 may spray a coating agent before and after the ink is discharged from the head 131. The coating unit 133 may be realized as an apparatus, such as a roller, a dispenser, and the like. The reason for spraying a coating agent is because an image printed on skin or fabric, and the like, may have a deteriorated quality in terms of ink adhesion, color reproducibility, quick dryness, and wear resistance when compared to printing an image on paper.

Figure 6A:
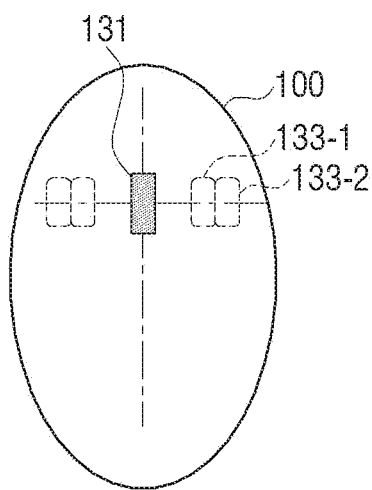
FIGS. 6A, 6B, and 6C illustrate a coating unit according to various embodiments of the present disclosure.
Figure 6B:
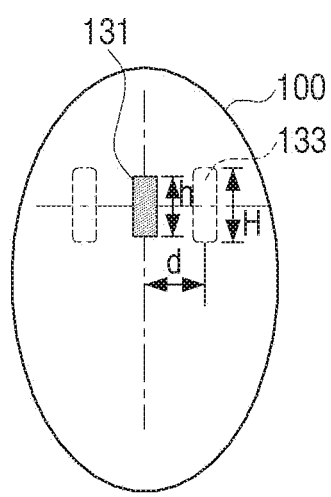
Figure 6C:
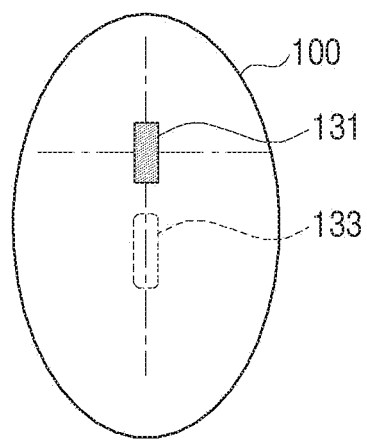

FIGS. 6A, 6B, and 6C illustrate a coating unit according to various embodiments of the present disclosure.

Referring to FIG. 6A, a pair of PRE/POST coating units 133-1, 133-2 is arranged on the left and right of the head 131. Since the proceeding direction of the head 131 is not consistent, the coating unit 133 may be arranged on both the left and right of the head 131. For example, if the head 131 proceeds to the right, the PRE coating unit 133-1 sprays the coating agent before the head 131 arrives at the current location, and when the head 131 arrives at where the ink is discharged, the POST coating unit 133-2 on the left may re-spray the coating agent.

FIG. 6B illustrates a length of a head and a coating unit and a distance between the head and the coating unit according to an embodiment of the present disclosure.

Referring to FIG. 6B, the length of the head 131 is expressed as being h, the length of the coating unit 133 as H, and the distance between the head 131 and coating unit 133 as d.

The length of the coating unit 133 may be realized to be longer than the length of the head 131. For example, a condition of H>h may be satisfied. When the length of the coating unit 133 is realized to be longer than the head 131, the area that the coating agent covers will be larger, and thus the head may always discharge the ink above the area where the coating agent is deposited.

The distance d between the head 131 and coating unit 133 may be determined based on the time it takes for the coating agent to dry and the maximum printable speed. In order to prevent the ink and the coating agent from mixing with each other, the ink must be discharged after the coating agent is dried. Therefore, the head 131 and the coating unit 133 must be distanced from each other at least by a distance corresponding to the maximum printable speed multiplied by the time it takes for the coating agent to be dried.

Referring to FIG. 6C, the coating unit 133 may be arranged below the head 131. In this arrangement, it is possible to secure sufficient time for the coating agent to be dried. When the mobile image forming apparatus 100 moves over the skin area on which a print image is to be printed for the first time, the coating unit 133 sprays the coating agent, but the head 131 does not discharge the ink. Thereafter, the head 131 starts discharging the ink when the head 131 arrives where the coating agent is deposited so as to print a print image. For example, using the characteristic that the coating unit has different reflecting characteristics from the skin, the mobile image forming apparatus 100 may determine whether it is an area where the coating agent is deposited through the location sensor, and the like.

The display 140 may display image contents and a UI element that includes graphic objects. More specifically, the display 140 may display a print image, an image of skin area on which a print image is to be printed, data analyzing UI, and an image searched online, and the like. The display 140 may be designed as one of various types of display panels. For example, the display 140 may be realized by various display technologies, such as a liquid crystal display (LCD), organic light-emitting diode (OLED), E-paper, plasma display panel (PDP), vacuum fluorescent display (VFD), field emission display (FED), electro luminescence display (ELD), and the like. The display panel is generally configured as a light emitting type panel, but without limitation, and thus the display panel may be configured as a reflective display panel instead. Furthermore, the display 140 may be configured as a flexible display or transparent display, and the like.

For example, the display 140 may be arranged on a top portion of the mobile image forming apparatus 100 and display an image of a skin area on which a print image is to be printed. Furthermore, the display 140 may combine a print image with a skin area and display the combined image in an augmented reality. For example, the image processor 120 may combine the print image with the image of the skin area on which the print image is to be printed. Furthermore, the display 140 may display the combined image. Through this process, the user may analyze the print result and adjust the size or location of the print image.

The display 140 may be realized in a touch screen format having a mutual layered structure with a touch pad, and the touch screen may be configured to detect a location of a touch input, size area of the touch input, and even a pressure of the touch input. In such a case, the display 140 may perform the function of the user interface 150 that will be described below.

The user interface 150 enables the mobile image forming apparatus 100 to transmit a command to and from the user.

As aforementioned, the user interface 150 may be realized in a screen format, but without limitation, and thus the user interface 150 may be realized in a voice recognition or motion recognition method instead.

The user interface 150 may receive a user input for adjusting the location or size of an image displayed on the display 140. For example, the user may adjust the size of an image through a pinch zoom operation. The image processor 120 may compensate a print image in response to the user input received.

The camera 160 photographs an image. The mobile image forming apparatus 100 may use the image photographed in the camera 160 as a print image. In another example, the camera 160 may be configured to substitute for the functions of the image sensor 113.

The communication interface 170 is configured as a wireless module so as to perform wireless communication with an external device. The communication interface 170 may include various communication chips, such as wireless communication chips including a Wi-Fi chip, Bluetooth chip, and near field communication (NFC) chip. In the case of using a Wi-Fi chip or Bluetooth chip, various connection information regarding service set identifier (SSID) or session keys may be transceived first and then used for making access, and then transceiver various information. A wireless communication chip refers to a chip for performing communication according to various communication standards, such as institute of electrical and electronics engineers (IEEE), ZigBee, 3rd generation (3G), 3rd generation partnership project (3GPP), and long term evolution (LTE).

Figure 7:
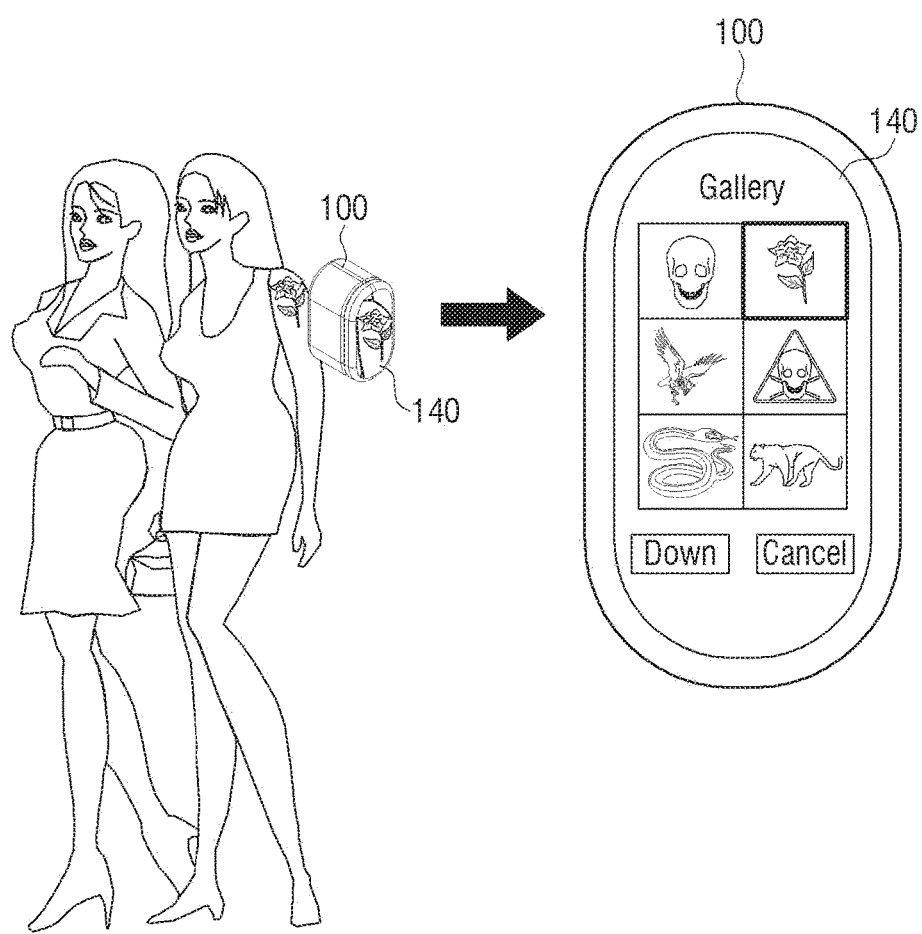
FIG. 7 illustrates photographing an image and determining a print image through searching according to an embodiment of the present disclosure.

FIG. 7 illustrates photographing an image and determining a print image through searching according to an embodiment of the present disclosure.

Referring to FIG. 7, an embodiment of searching online for an image that is similar to an image photographed in the camera 160 and using the searched image as a print image is illustrated.

Referring to FIG. 7, it is possible to photograph a tattoo on another person's body using the camera 160. The screen being photographed in the camera 160 may be displayed on the display 140 on live view. The image processor 120 may control the communication interface 170 to remove the skin color from the photographed image and to search online for an image that is similar to the image without the skin color. Referring to FIG. 7, searched results of images are displayed on the display 140, and in response to a user command for selecting one of them, the selected image may be used as the print image.

The image processor 120 may analyze a phase difference of a color of a photographed image and automatically delete a skin color portion. Furthermore, a user input of cropping only an image portion to be printed among the photographed image may be received through the user interface 150.

Figure 8:
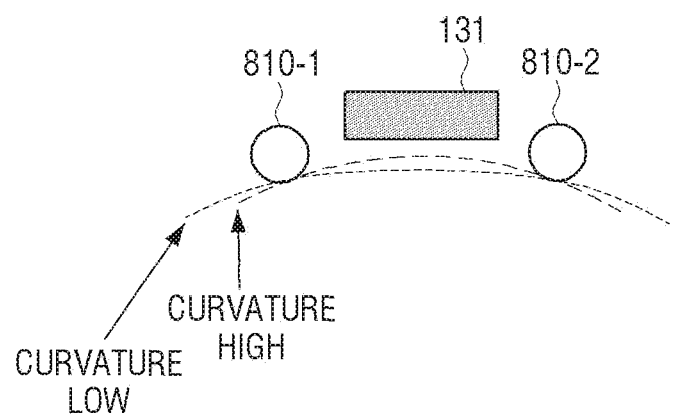
FIG. 8 illustrates a member configured to maintain a certain distance between skin and an image former according to an embodiment of the present disclosure.

FIG. 8 illustrates a member configured to maintain a certain distance between skin and an image former according to an embodiment of the present disclosure.

Referring to FIG. 8, since the mobile image forming apparatus 100 according to an embodiment of the present disclosure is based on an assumption that the mobile image forming apparatus 100 prints an image on a skin having curves, the print environment is different from that of a general image forming apparatus where a constant distance is maintained between the paper and ink cartridge.

If the distance between the skin on which a print image is to be printed and the head 131 is narrow, the skin may get burned by contact. On the contrary, if the distance between the skin on which a print image is to be printed and the head 131 is wide, the print quality may deteriorate due to ink dispersion and increase of dot size. Therefore, it is necessary to maintain a certain distance between the skin and head 131 even though the skin is curved.

FIG. 8 illustrates member 810-1, 810-2 for maintaining a constant distance between the head 131 and skin. The members 810-1, 810-2 may move the head 131 upwards in response to high curvatures, and move the head 131 downwards in response to low curvatures. Accordingly, the mobile image forming apparatus 100 may maintain a constant distance between the head 131 and skin even if there is a curvature on a print area.

Figure 9:
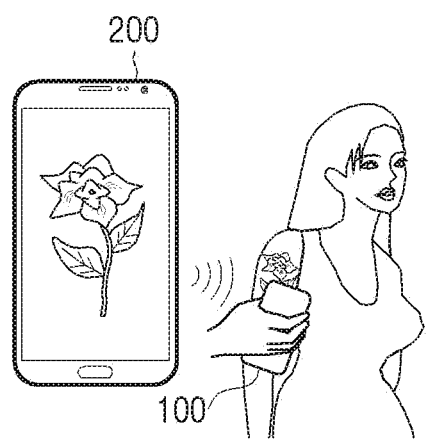
FIG. 9 illustrates a concept of a mobile image forming apparatus operating in an interlocked manner with a mobile apparatus according to an embodiment of the present disclosure.

FIG. 9 illustrates a concept of a mobile image forming apparatus that operates in an interlocked manner with a mobile apparatus according to an embodiment of the present disclosure.

Referring to FIG. 9, in an embodiment of the present disclosure, a print image may be selected in the mobile apparatus 200. Furthermore, the mobile apparatus 200 may transmit the selected image to the mobile image forming apparatus 100. The mobile image forming apparatus 100 may print the received print image after compensating the received print image to be suitable to the surface state.

In another embodiment of the present disclosure, the mobile apparatus 200 may perform further perform the function of compensating the print image. The mobile apparatus 200 may transmit the compensated print image to the mobile image forming apparatus 100, and the mobile image forming apparatus 100 may merely perform only the print function.

According to the aforementioned various embodiments of the present disclosure, it is possible to compensate an image data according to the state of the skin on which a print image is to be printed, so that the image being printed is not different from the original print image in terms of color tone and shape.

Figure 10:
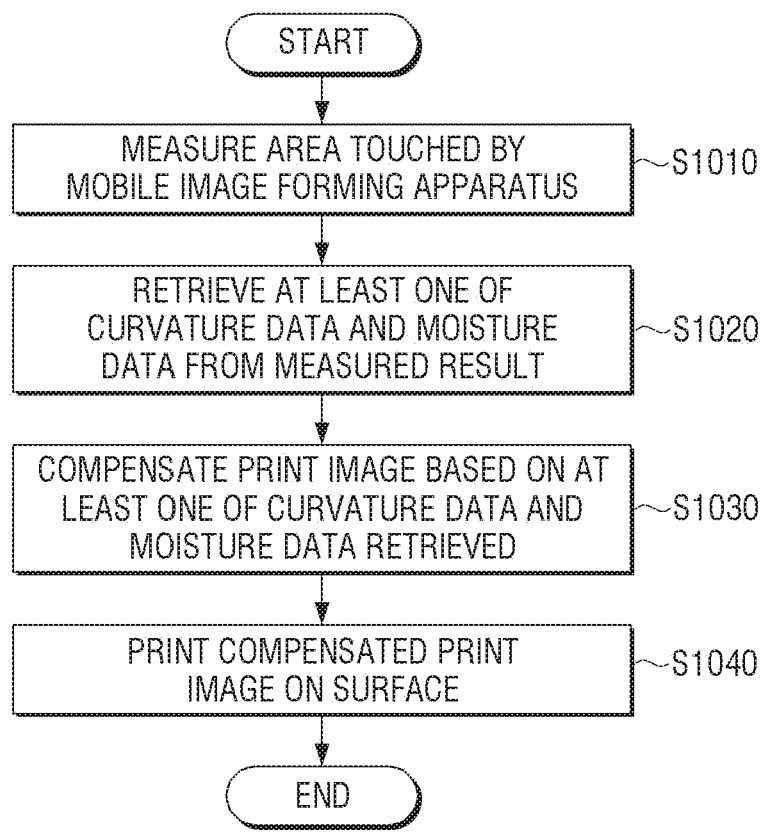

FIGS. 10 and 11 are flowcharts illustrating a method for compensating an image of a mobile image forming apparatus according to various embodiments of the present disclosure.

Referring to FIG. 10, among a surface area on which a print image is to be printed, the mobile image forming apparatus 100 measures an area touched by the mobile image forming apparatus 100 at operation S1010. The mobile image forming apparatus 100 may measure the brightness, color tone, curved state of the touched area. Furthermore, the mobile image forming apparatus 100 may measure the moisture content and hydrogen ion concentration of the touched area.

Furthermore, the mobile image forming apparatus 100 may retrieve at least one of curvature data and moisture data from the measured result at operation S1020. In addition to the curvature data and moisture data, the data retrieved by the mobile image forming apparatus 100 may include brightness data. The mobile image forming apparatus 100 may photograph an image of the touched area, analyze the photographed image, and retrieve at least one of the brightness data and curvature data.

Thereafter, the mobile image forming apparatus 100 may compensate the print image based on the at least one of the brightness data and curvature data retrieved at operation S1030. For example, the mobile image forming apparatus 100 may compensate the color of the print image using a pre-stored conversion table based on the retrieved brightness data. If the brightness of the retrieved brightness data is low, it is possible to compensate the brightness of the print image by increasing the discharge amount of W ink among C, M, Y, W ink. In another example, the mobile image forming apparatus 100 may detect a curved state of a print area, and perform a three-dimensional rendering on the two-dimensional print image. In another example, the mobile image forming apparatus 100 may compensate the ink discharge amount for the print image based on the measured moisture content or hydrogen ion concentration. The mobile image forming apparatus 100 may compensate such that the lower the moisture content and the higher the hydrogen ion concentration, the more ink is discharged.

Lastly, the mobile image forming apparatus 100 prints the compensated print image on a surface at operation S1040.

FIG. 11 is a flowchart illustrating an embodiment taking into consideration power and operating order of each sensor included in a mobile image forming apparatus according to an embodiment of the present disclosure.

Referring to FIG. 11, after touching a position on which a print image is to be printed, the mobile image forming apparatus 100 applies power to a location sensor at operation S1105. The location sensor may determine relative motions of the mobile image forming apparatus 100 into two-dimensional coordinates based on the location initially touched by the mobile image forming apparatus 100. If the location sensor is capable of photographing the state of the skin on which a print image is to be printed using an optical method at operation S1110-Y, an image sensor may not be used. Therefore, in the case where the location sensor does not use an optical method (1110-N), the mobile image forming apparatus 100 applies power to the image sensor at operation S1115.

Thereafter, the mobile image forming apparatus 100 retrieves the skin brightness data of the area on which a print image is to be printed using the image sensor or location sensor at operation S1120. The mobile image forming apparatus 100 compares the brightness value with a default to determine whether the color of the print image needs to be compensated at operation S1125. For example, in the case where the color of the print image needs to be compensated at operation S1125-N, the mobile image forming apparatus 100 may compensate the color tone of the print image using the pre-stored conversion table at operation S1130.

Thereafter, the mobile image forming apparatus 100 retrieves curvature data at operation S1135. Likewise, the mobile image forming apparatus 100 compares the curvature value with a default to determine whether a shape compensation is necessary at operation S1140. For example, in the case where there is no curvature or the curvature value is close to a plane at operation S1140-Y, the mobile image forming apparatus 100 may not perform a compensation according to curvature. If not however at operation S1140-N, the mobile image apparatus 100 compensates the shape of the print image according to the curvature at operation S1145.

Thereafter, the mobile image forming apparatus 100 retrieves moisture data at operation S1150. The mobile image forming apparatus 100 compares the moisture value with a default to determine whether it is necessary to adjust the ink discharge amount for the print image at operation S1155. For example, the mobile image forming apparatus 100 may set the default as a neutral skin. In such a case, in response to determining the skin as being oily or dry at operation S1155-N, the mobile image forming apparatus adjusts the ink discharge amount at operation S1160. In response to determining the skin as oily, the mobile image forming apparatus 100 may reduce the ink discharge amount, whereas in response to determining the skin as being dry, the mobile image forming apparatus 100 may increase the ink discharge amount. Lastly, the mobile image prints the compensated print image on the surface at operation S1165. However, there is no limitation to the order of compensating the print image using brightness data, curvature data, and moisture data as illustrated in FIG. 11.

Besides the above, various embodiments of the method for compensating an image of the mobile image forming apparatus 100 overlap with the explanation made on the various embodiments of the mobile image forming apparatus 100, and thus repeated explanation is omitted.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile printer for skin printing comprising:
   a communication interface configured to receive image data from an external electronic apparatus; and
   an image former comprising a coating unit configured to spray a coating agent on a user's skin according to a movement of the mobile printer, and a head configured to discharge an ink on the skin sprayed with the coating agent based on the received image data to print an image corresponding to the received image data on the user's skin.

2. The mobile printer of claim 1, further comprising:
   a location sensor configured to sense a movement of the mobile printer,
   wherein the image former adjusts ink discharge according to the sensed movement of the mobile printer.

3. The mobile printer of claim 2, wherein the location sensor comprises:
   a first location sensor configured to sense up and down movements of the mobile printer; and
   a second location sensor configured to sense right and left movements of the mobile printer.

4. The mobile printer of claim 2, wherein the location sensor emits laser and senses the movement of the mobile printer based on the irradiated laser.

5. The mobile printer of claim 1, further comprising:
   an image sensor configured to photograph a skin; and
   an image processor configured to calibrate a color of the image data based on the image photographed through the image sensor,
   wherein the image former prints an image corresponding to the calibrated image data.

6. The mobile printer of claim 1, wherein the head is arranged on a back side of the coating unit with reference to a printing direction.

* * * * *